UNITED STATES PATENT OFFICE.

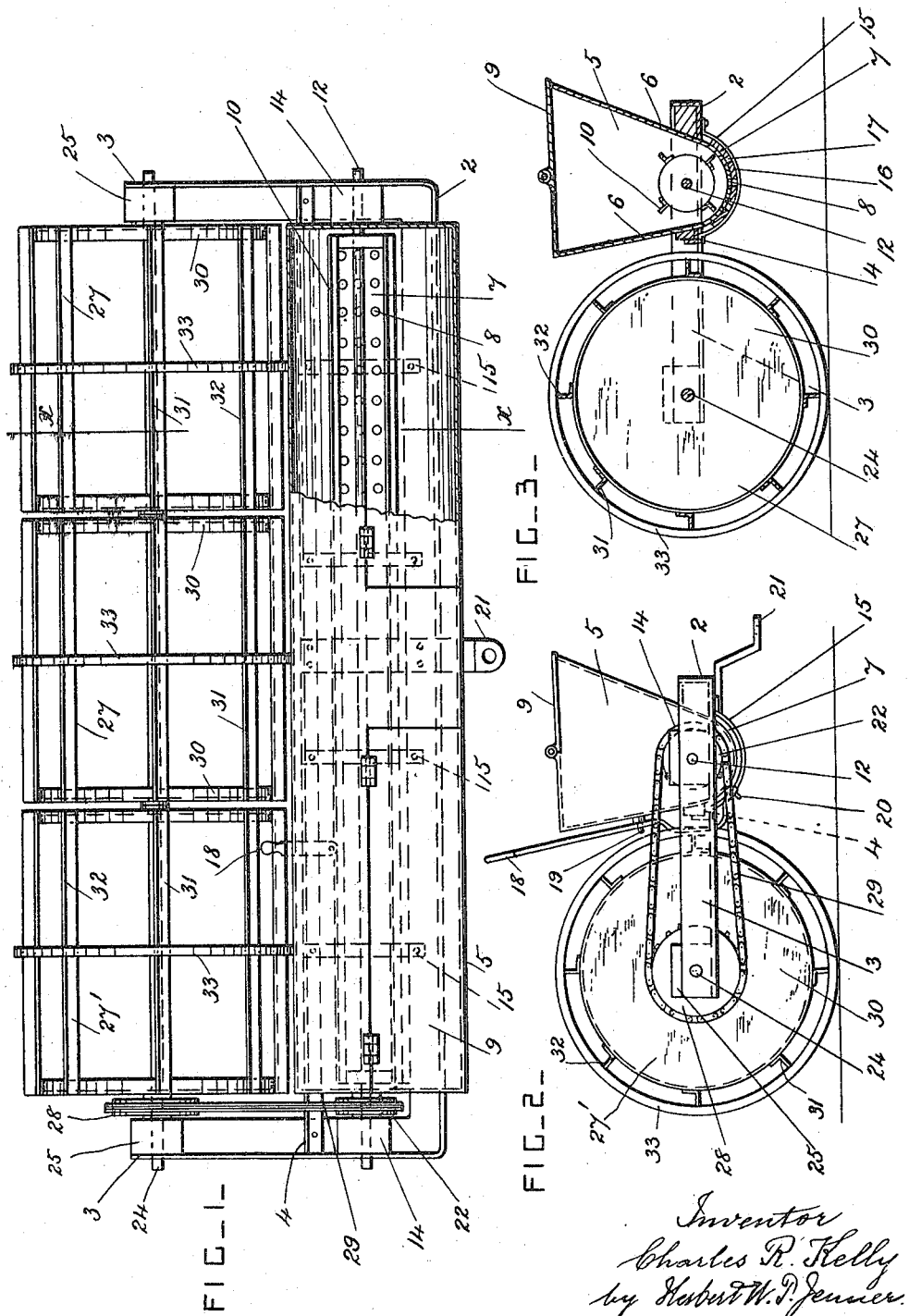

CHARLES R. KELLY, OF CAMBRIDGE SPRINGS, PENNSYLVANIA.

FERTILIZER-DISTRIBUTER.

1,221,742.

Specification of Letters Patent.

Patented Apr. 3, 1917.

Application filed February 3, 1916. Serial No. 75,976.

*To all whom it may concern:*

Be it known that I, CHARLES R. KELLY, a citizen of the United States, residing at Cambridge Springs, in the county of Crawford and State of Pennsylvania, have invented certain new and useful Improvements in Fertilizer-Distributers; and I do hereby declare the following to be a full, clear, and exact description of the invention, such as will enable others skilled in the art to which it appertains to make and use the same.

This invention relates to distributers for fertilizer, lime, and other substances; and it consists in the novel construction and combination of the parts hereinafter fully described and claimed.

In the drawings, Figure 1 is a plan view of a fertilizer distributer constructed according to this invention and showing a portion of the hopper in section. Fig. 2 is an end view of the fertilizer distributer. Fig. 3 is a cross-section, taken on the line x—x in Fig. 1.

A frame 2 is provided, and is formed of an angle-shaped front bar having rearwardly projecting end portions or arms at its ends. The main portion of the bar extends across the front of the machine, and a rear bar 4 is secured between the middle parts of the end portions or arms 3, and is arranged parallel to the main portion, so that a rectangular opening or space is formed.

A hopper 5 is provided and has converging front and rear sides, and a curved bottom 7 having perforations 8. The top of the hopper is provided with hinged lids 9 so that the material can be placed in it. The hopper is arranged in the said rectangular opening with its front and rear sides 6 resting against the front and rear bars of the frame.

An agitator 10 is secured on a shaft 12 which projects through the ends of the hopper. This agitator is revolved in the hopper as the machine is drawn along, and it is of any approved construction. The agitator shaft is journaled in bearing blocks 14 which are secured to the frame at the ends of the hopper.

Curved bands 15 are secured to the front and rear bars of the frame, and are arranged at intervals under the bottom of the hopper. A curved slide 16 provided with perforations 17 is slidable longitudinally between the bottom of the hopper and the curved bands 15 and is supported by the said bands.

An operating lever 18 is pivoted to the rear side of the hopper by the pin 19, and is connected to the slide 16 by a pin 20. The outlet from the hopper is regulated by means of the lever 18 which moves the slide back and forth so that the perforations 8 are covered or uncovered more or less, as occasion requires. A draft attachment 21 is secured to the middle parts of the front and rear bars of the frame, for drawing the machine along. A sprocket wheel 22 is secured on one end portion of the agitator shaft, outside the hopper.

A digging roller is arranged behind the hopper. This roller is mounted on a shaft 24 which is journaled in bearing blocks 25 secured to the rear parts of the arms 3. The roller is preferably formed of three similar sections 27, one of which, marked 27', is secured to the shaft, and the other two sections are mounted loosely on the shaft. A sprocket wheel 28 is secured on the shaft 24, and 29 is a drive chain which passes over the wheels 28 and 22, so that the agitator is revolved from the roller shaft.

The roller sections each comprise a pair of end disks 30 having angle-shaped bars 31 secured to their peripheries and extending between them.

One flange of each bar 31 is arranged circumferentially of the disks, and its other flange 32 projects radially and forms a blade which digs into the ground as the machine is drawn over soft soil. Each roller has a stiff tire 33 secured over the tops of its flanges 32, and arranged at its middle part. Each tire 33 is formed of a continuous ring, and it is permanently secured in place with its under surface bearing against the tops of the radial flanges. These tires sink into soft soil, but when the machine is drawn along a hard road they support the machine so that the digging flanges or blades are not injured, and the road is not marked or torn up. The provision of three roller sections enables the machine to be turned around with facility, and also enables a wider machine to be built.

The material is placed in the hopper in pulverized form, and is dropped onto the land as the machine is drawn along, and is mixed with the soil by the digging roller.

The hopper can be made of any convenient material, and can be lifted out from the opening in the frame as often as necessary.

What I claim is:

In a fertilizer distributer, a frame, a roller shaft supported in the frame, a roller for covering the fertilizer after it has been dropped on the ground, said roller being formed of a series of similar sections mounted on the said shaft, each roller section having radial digging blades which extend longitudinally of it, and having also a single projecting annular tire secured to the tops of the said blades at the middle part of their length.

In testimony whereof I have affixed my signature.

CHARLES R. KELLY.

Copies of this patent may be obtained for five cents each, by addressing the "Commissioner of Patents, Washington, D. C."